United States Patent Office 3,141,622
Patented July 21, 1964

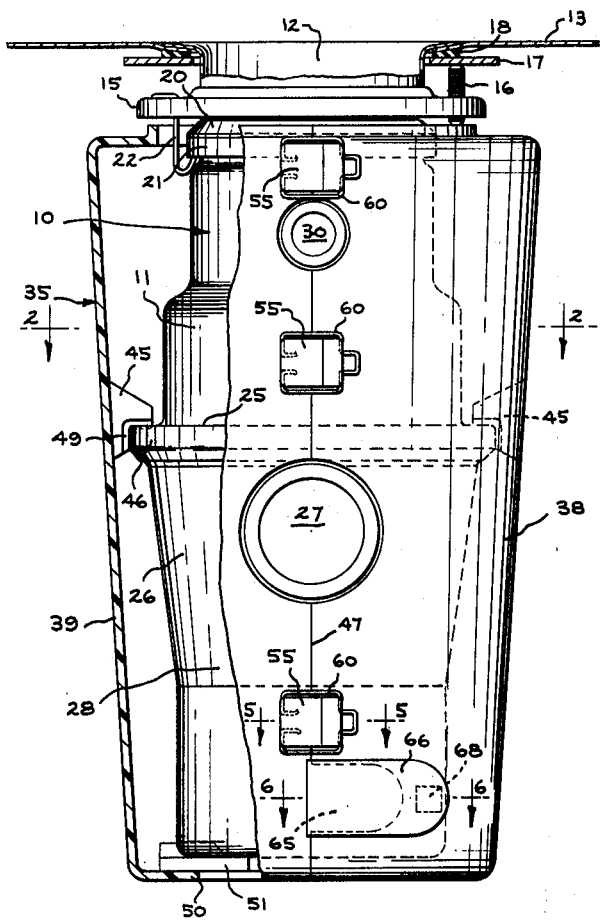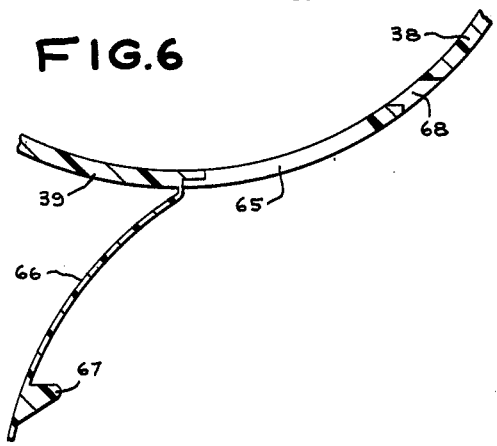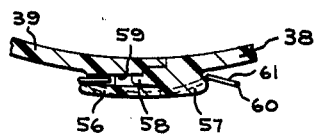

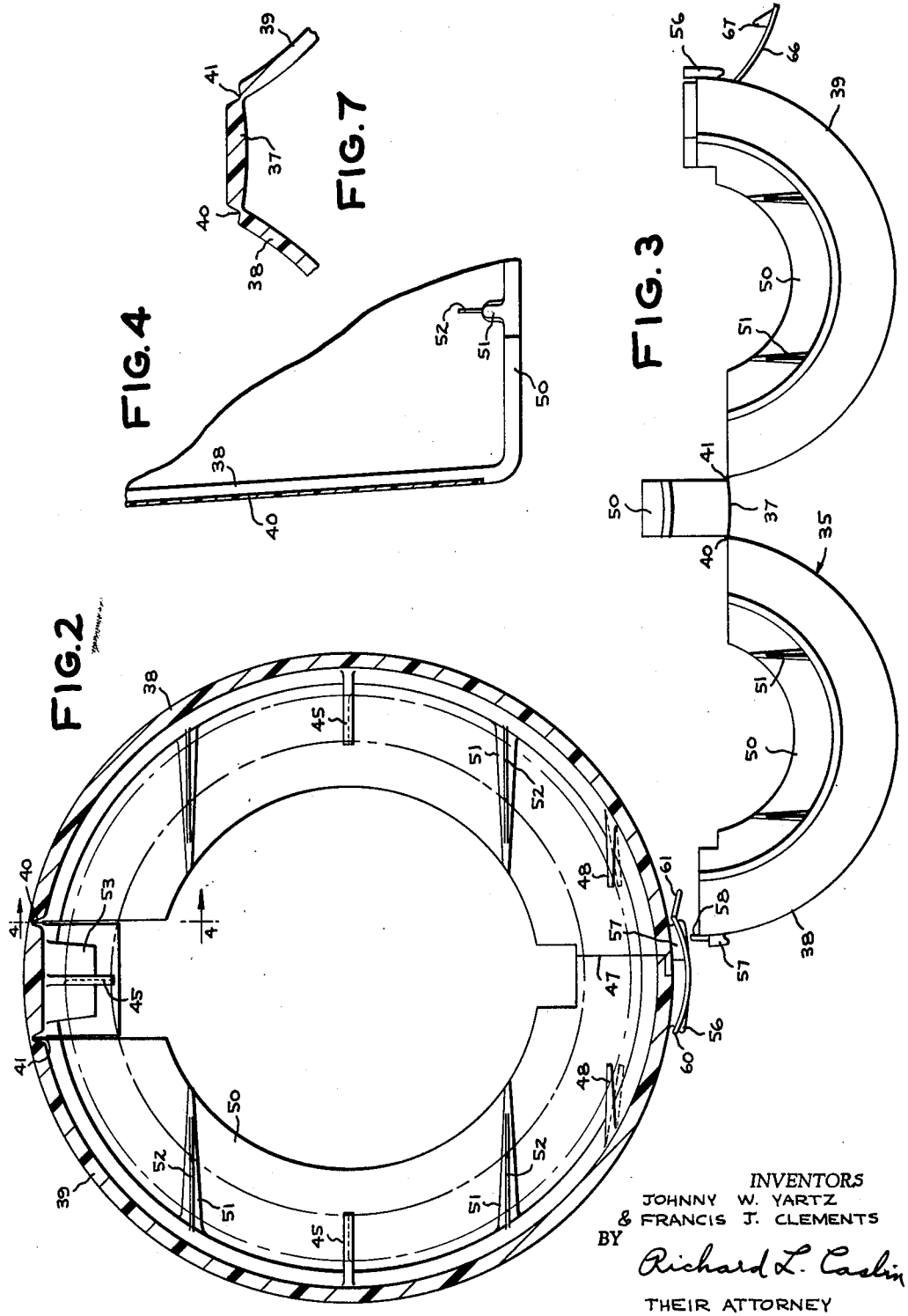

3,141,622
APPEARANCE COVER FOR FOOD WASTE
DISPOSER
Johnny W. Yartz, Anchorage, and Francis J. Clements, Louisville, Ky., assignors to General Electric Company, a corporation of New York
Filed Apr. 16, 1962, Ser. No. 187,617
8 Claims. (Cl. 241—46)

This invention relates to apparatus for the disposal of food waste and the like, and particularly to a molded plastic, one-piece appearance cover which is formed to encompass the apparatus and substantially close around the top and bottom thereof.

Conventional food waste disposal apparatus includes a vertical extending hopper means having a top access opening for receiving water and waste material therethrough. This hopper means is adapted to be suspended below the drain opening of the kitchen sink. Rotatable comminuting means are disposed adjacent the bottom of the hopper and an electrically driven power means is provided below the comminuting means and operatively joined thereto for driving the comminuting means. A suitable drain line is connected to a sump beneath the comminuting means for carrying off the water entrained food waste into the sewer system provided for the home.

A large percentage of food waste disposers are displayed and sold to the consumer public in appliance stores, in appliance departments of department stores, and in such other sales outlets where they are in open competition with other work-saving appliances for the home such as clothes washers and dryers, dishwashers, ranges, refrigerators, and air conditioners. In this particular consumer market the appearance of a particular appliance can be a deciding factor in promoting the sale thereof, since the buying public is becoming more appearance conscious as time goes on. As a result more time and effort is now being expended by appliance manufacturers in the area of industrial design.

The principal object of the present invention is to provide a one-piece hinged appearance cover for a food waste disposer apparatus.

A further object of the present invention is to provide a molded plastic, one-piece, hinged appearance cover of the class described having both a top and bottom wall for substantially encompassing the disposer apparatus.

A still further object of the present invention is to provide an appearance cover of the class described with means for attaching the cover to the disposer apparatus in a manner so that the disposer serves to reinforce the cover.

Briefly stated, in accordance with one aspect of this invention, we provide an appearance cover for a food waste disposal apparatus where following common practice the apparatus has a vertically extending hopper means that is adapted to be suspended beneath the drain opening of a kitchen sink. Adjacent the bottom portion of the hopper is a rotatable comminuting means, and beneath the comminuting means is a power means for driving the comminuting means. This is the background information for the device to which the appearance cover of the present invention is to be assembled. The cover is of split single piece construction that is molded of a suitable plastic material with an integral hinge means so that the cover may be wrapped around and fastened to the disposer apparatus in a suitable manner. The cover is of generally elongated cylindrical shape that is split down along one longitudinal side thereof. The opposite longitudinal side has an integral hinge means that is formed by the mold as one or more narrow grooves in the material to rely on a necked-down or reduced material cross-section so that the cover may be flexed open to fit around and encompass the apparatus. A suitable latch means is provided adjacent the split side of the cover for holding the cover closed around the apparatus.

Our invention will be better understood from the following description taken in conjunction with the accompanying drawings and its scope will be pointed out in the appended claims.

FIGURE 1 is an elevational view of a food waste disposer apparatus suspended from the drain opening of a kitchen sink and showing one embodiment of a molded plastic appearance cover of the present invention assembled around the disposer apparatus;

FIGURE 2 is a cross-sectional plan view of the appearance cover of FIGURE 1 taken on the line 2—2 of FIGURE 1 with the disposer removed;

FIGURE 3 is an elevational view of the appearance cover FIGURE 1 wherein the cover is shown in its as-molded position where the two semi-cylindrical halves of the cover are separated by extra thin webs of plastic material which serve as a hinging means;

FIGURE 4 is a fragmentary cross-sectional elevational view through one of the hinging sections of the cover taken on the line 4—4 of FIGURE 2;

FIGURE 5 is a fragmentary cross-sectional plan view taken through one of the locking means for the split side of the cover on the line 5—5 of FIGURE 1;

FIGURE 6 is a fragmentary cross-sectional plan view taken on the line 6—6 of FIGURE 1 to show the resilient flap member for closing the access opening in the cover, through which opening the wiring connection of the disposer to a power circuit may be made; and FIGURE 7 is a fragmentary cross-sectional elevational view across the integral hinge means of the plastic cover when the cover is in its open as-molded position of FIGURE 3.

Turning now to a consideration of the drawings and in particular to FIGURE 1, there is shown one embodiment of a plastic cover 35 of the present invention applied to a food waste disposer 10 having a generally cylindrical tubular casing or hopper 11. The upper end of the hopper is designed to be suspended from the drain opening or sink flange 12 of a typical kitchen sink 13 or the like. Any suitable suspension means may be employed, as for example, the design disclosed and claimed by the present applicants in the copending patent application Serial No. 133,219 filed August 22, 1961, now Patent No. 3,108,755, and assigned to the General Electric Company, the assignee of the present invention. Briefly, the suspension means comprises an annular mounting ring 15 which is adapted to be telescoped over the sink flange 12 and supported therefrom by an underlying snap ring (not shown) or the like. The sink flange is held tightly in the drain opening of the sink by a plurality of spaced bolts 16 which are threaded into the mounting ring 15 and may be elevated to bear against a clamping ring 17 which underlies the bottom of the sink 13 but is spaced therefrom by a resilient sealing gasket 18 of rubber or the like material. This clamping action of the bolts 16 between the mounting ring 15 and the clamping ring 17 is performed prior to the assembly of the disposer 10 to the mounting ring 15 as will be well understood in this art.

The upper end of the hopper 11 is provided with a sealing gasket 20 of elastomeric or the like material which is clamped around the mouth of the hopper by a metal band 21. The mounting ring 15 supports a plurality of metallic hook members 22 that depend from the underside thereof for snapping engagement beneath the clamping band 21 for a quick connect assembly of the disposer to the mounting ring 15 and hence through the mounting ring to the sink flange 12. A twisting action of the disposer is necessary in order to effect the withdrawal of the hook members 22 from the clamp band so that the disposer may be dis-assembled from the sink flange when desired. Since the illustrated suspension means does not form part of the present invention a more detailed showing and explanation is deemed unwarranted, so that particular emphasis can be given to the principal invention of this application.

The bottom of the hopper 11 terminates adjacent the mid-height of the disposer. Within this lower area of the hopper there is a comminuting means 25 which is not shown since any suitable comminuting means may be employed, as for example, the rotatable comminuting assembly disclosed and claimed by one of the present applicants in co-pending patent application Serial No. 133,143 filed August 22, 1961, now Patent No. 3,112,077, and assigned to the General Electric Company, the assignee of the present invention. Beneath the comminuting means is a drainage chamber or sump identified by numeral 26 but not shown, which empties into a drain line 27 for carrying off the water and comminuted waste material to the available sewer connection. Disposed below the hopper 11 is a motor housing 27 which may be either a molded plastic material such as epoxy resin for a potted motor design or a metal motor housing for a standard fabricated motor. It should be understood that a motor rotor (not shown) would be provided within the motor to represent the drive means for the comminuting means 25 of the disposer.

To summarize, this invention is usable with a standard type of food waste disposer having substantially three main components namely, an upper hopper means 11, a centrally disposed comminuting means 25, and a lower power means 27 for driving the comminuting means and grinding up the food waste that is loaded into the hopper through the sink flange 12 of the sink.

A second drain line 30 may be furnished with the disposer and it is located directly above the sewer drain 27 and in the side wall of the hopper 11 for making a drain connection from an automatic dishwasher to the disposer so as to simplify the plumbing for the dishwasher.

As mentioned previously, a great deal of importance is attached to the appearance of a household appliance such as portable electric appliances and major appliances. Accordingly, the appearance cover 35 has been fashioned for the disposer 10 to give a pleasing appearance to the disposer and enhance its marketability. There is a decided advantage in being able to provide an appearance cover of one-piece construction because of the simplicity and low cost of tooling and the greatly reduced inventory problem for replacement parts over a long span of years. History teaches that the appearances and designs of appliances change periodically so that standardization is a serious problem facing the appliance field.

Our invention has been accomplished by forming the appearance cover 35 of a semi-rigid molded plastic material of polypropylene although other materials such as polyethylene and polytetrafluoroethylene which is sold under the trademark "Teflon" might be used for comparable results. While this invention does not represent the first plastic appearance cover that was ever devised for a food waste disposer, it is believed to be the first such cover of one-piece split cylindrical construction that has both top and bottom walls for substantially encompassing the entire disposer. Moreover, it has integral hinges of necked-down cross-section molded into the plastic material so as to be able to open the cover and wrap it around the disposer and thereafter close the cover and lock it closed to form the completed assembly.

FIGURE 3 of the drawings accompanying this application illustrate an elevational view of the manner of molding the cover in the folded open position so that it is easy to withdraw the movable molding tool, in our case the mold cavity from the fixed mold part or force. This is to be compared with a molding operation of a tubular cylinder where the movable molding tool would have to enter and leave through one end of the mold thereby eliminating the possibility of having a cover with substantially two closed ends. Actually the plastic cover 35 may be considered as being divided into three longitudinal portions; an elongated central portion 37 of narrow form, and two semi-cylindrical portions 38 and 39 which are each connected to the central portion 37 by a separate integral hinge means as at 40 and 41 of thin necked-down, web-like cross-section, as is best seen in FIGURE 2. In other words there are two parallel hinge means 40 and 41 extending longitudinally down one side of the appearance cover 35 so as to facilitate the ease of accurately molding the necked-down hinge means to close tolerances. The semi-cylindrical parts may be flexed repeatedly, in fact, with respect to the central portion 37 many hundreds of thousands of times before failure of the web due to splitting could be reasonably expected. It is understood that much of this unique flexing action is due to the particular type of preferred plastic material; namely, polypropylene which is being used in production by the present assignee of this invention. However, it is recognized that other plastic materials are available which have flexing properties that are nearly as good and certainly more than is necessary for the few times the cover need be opened or flexed during the assembly or repair of the disposer.

Understandably, it is necessary to fasten the appearance cover 35 to the disposer 10 in some manner for ease in handling the unit once it is completely assembled in the factory, and also after it is mounted beneath the sink. As is best shown in FIGURES 1 and 2, circumferentially spaced ribs 45 are molded on the interior of the cover and each rib has the form of an inverted L-shaped bracket member where the base of the L overlies a circumferential flange 46 where the bottom of the hopper is attached to the top of the motor housing 27. One of these ribs 45 is formed as part of each semi-cylindrical portion 38 and 39 of the cover and diametrically opposed to each other. A third rib 45 is joined to the central portion 37 of the cover.

It would not be feasible to try to mold a similar rib adjacent the split edge of the cover at 47 where the two ends of the cover portions 38 and 39 mate when the cover is closed. For this reason flexible tabs 48 are formed adjacent the split edge 47 of the cover to extend generally in a single plane parallel to the longitudinal axis of the cover member rather than radially to the longitudinal axis as are the rib members 45. By studying FIGURE 2, it should be clear that the ribs 45 and tabs 48 extend generally parallel to each other when the cover is in its as-molded position of FIGURE 3. The ribs 45 are molded with a thin flashing 49 on the interior of the L-shape for making a pressing engagement or interference fit against the flange 46 of the disposer. This action makes it difficult to close the cover completely which, as will be explained hereafter, tends to improve the locking feature of the cover and also serves to utilize the disposer as a reinforcing member for the cover so as to prevent collapsing of the cover in the center portion between the top and the bottom end thereof, as well as prevent relative movement therebetween.

Before the disposer is installed under the kitchen sink, the weight of the disposer will be resting on the bottom wall 50 of the cover. This bottom wall is also formed with vertical extending fins 51 which are, in the illustrated embodiment, four in number and arranged in pairs where each pair lies within a common plane and extends generally parallel to the tabs 48 as is best seen in FIGURE 2. These fins 51 are also formed with thin flashings or edges 52 as is best illustrated in FIGURE 4. These flashings are similar to the flashings 49 of the ribs 45 to again press tightly with an interference fit against the disposer housing with the result that the disposer serves to reinforce the plastic cover 35. Element 53 in FIGURE 2 is a cylindrical grommet that is molded on the lower interior surface of the central portion 37 for holding a motor overload switch (not shown). A motor restart button would be furnished with the switch and would extend through a suitable opening in the cover so as to be accessible from outside the cover.

Next to be discussed is the locking means arranged adjacent the split edge 47 of the cover 35 in order to hold the cover in place around the disposer. Actually, what is shown at 55 are three latches which are each represented by inter-engaging raised portions 56 and 57 on the outer surface of the cover where the element 57 has a tongue member 58 that fits into a groove 59. After the tongue is in engagement within the groove 59, a bail member 60, which is fastened to the element 56 is swung over element 57 and bound thereto in a latching engagement. It should be noted that the bail member 60 is of thin wire form and is bowed to have flexibility so that it may be sprung over the element 57. A finger piece 61 is arranged on the distal end of the bail member for opening and closing the latch.

The appearance cover 35 has been designed so that a power supply cable may be electrically connected to the disposer without removing the cover. This is effected by forming a large access opening 65 as in portion 38 of the cover adjacent the bottom thereof so that the cable may be brought up through a central opening in the bottom wall of the cover and the wiring connection made through the opening 65. It is well to keep this opening 65 closed whenever possible and this closure is provided by a resilient flap 66 which is formed on a split edge of the semi-cylindrical cover portion 39 as is best seen in FIGURES 3 and 6. The distal end of this flap 66 is provided with a hook portion 67 which is adapted to be confined within a keeper opening 68. It should be recognized that this resilient flap member 66 has such good holding qualities in the keeper opening 68 that it is possible to eliminate the latching means 55 and substitute several resilient flap members similar to flap 66 so that no bail member 60 would be necessary and the appearance cover would be a true one-piece construction. It is conceivable that as time goes on the bail member will be eliminated and a simpler fastening means such as the resilient flaps 66 be substituted.

Modifications of this invention will occur to those skilled in this art therefore it is to be understood that this invention is not limited to the particular embodiment disclosed but that it is intended to cover all modifications which are within the true spirit and scope of this invention as claimed.

What we claim as new and desire to secure by Letters Patent of the United States is:

1. In a waste disposal apparatus, the combination of:
    vertically extending hopper means having a top access opening for receiving water and waste material,
    rotatable comminuting means adjacent to the lower end of said hopper means,
    power means below and operatively connected to both said hopper means and comminuting means and operable to drive said comminuting means,
    suspension means connected to the upper end of said hopper means and adapted to be connected to a sink drain opening so as to suspend said waste disposal apparatus therefrom,
    an ornamental appearance cover separate from and enclosing said hopper means, said comminuting means, and said power means and being spaced therefrom with a hollowness therebetween,
    the appearance cover being formed of semi-rigid plastic material and split down along one vertical side thereof, the opposite vertical side having at least one longitudinal groove forming a relatively flexible integral hinge means of reduced cross-section so that the cover may be opened to fit around and encompass the apparatus, and locking means adjacent the split side of the cover for holding the cover closed around the apparatus.

2. In a waste disposal apparatus as recited in claim 1 wherein the appearance cover is formed of polypropylene material and the inner surface of the cover is formed with spacer means which press against the various sides of the apparatus to support the cover from the apparatus as well as to center the cover therearound.

3. In a waste disposal apparatus as recited in claim 1 wherein the appearance cover is formed with a bottom wall that underlies the bottom of the power means of the apparatus,
    while the upper end of the cover is provided with an annular horizontal flange which surrounds the upper end of the hopper.

4. An ornamental appearance cover for use with a food waste disposal apparatus comprising:
    a one-piece molded semi-rigid plastic structure of generally cylindrical shape,
    said structure including a partial top wall and a partial bottom wall,
    one longitudinal side of the structure being split, and
    at least one longitudinal groove in the side of said structure opposite said split to form a relatively flexible integral hinge means of reduced cross section.

5. An ornamental appearance cover for use with a food waste disposal apparatus as recited in claim 4,
    wherein the said integral hinge means comprises at least two parallel grooves which are closely spaced to each other on the inner surface of the cover,
    the split side of the cover including a locking means for holding the cover closed to form a completed assembly.

6. An ornamental appearance cover for use with a food waste disposal apparatus as recited in claim 5 with the addition of rib means formed on the inner sides of the cover and adapted to bear against a waste disposal apparatus with an interference fit in such a manner that the apparatus serves to reinforce the cover when they are assembled together and prevent relative movement therebetween.

7. In a food waste disposer apparatus, the combination of:
    vertically extending hopper means having a top access opening for receiving water and waste material therethrough,
    rotatable comminuting means adjacent to the lower end of said hopper means,
    power means below and operatively connected to both said hopper means and comminuting means and operable to drive said comminuting means,
    suspension means connected to the upper end of said hopper means and adapted to be connected to a sink drain opening so as to suspend said waste disposer apparatus therefrom,
    an ornamental appearance cover separate from and enclosing said hopper means, said comminuting means, and said power means,
    the appearance cover being a one-piece molded elongated cylindrical form of semi-rigid polypropylene material,
    there being a partial top and bottom wall for the cylindrical form so as to substantially encompass the disposer,
    one longitudinal side of the cover being split while the opposite side of the cover is grooved longitudinally to form a relatively flexible integral hinge means so that the cover may be opened to fit around and encompass the disposer,
    and rib means formed on the inner surface of the cover to bear against the disposer when the cover is closed therearound so that the disposer serves to reinforce the cover against external forces, the split side of the cover including locking means fitted thereacross in order to hold the cover assembled to the disposer.

8. In a waste disposal apparatus as recited in claim 7, wherein the rib means is formed with flexible edges that bear against the disposer with an interference fit to give a tight clamping action and assist in reinforcing the cover.

References Cited in the file of this patent

UNITED STATES PATENTS

| | | |
|---|---|---|
| 2,629,558 | Miller | Feb. 24, 1953 |
| 2,631,631 | Vogel | Mar. 17, 1953 |
| 2,758,707 | Baratelli | Aug. 14, 1956 |
| 2,851,224 | Jordan | Sept. 9, 1958 |
| 2,965,318 | Jordan | Dec. 20, 1960 |
| 3,043,354 | Fitzgerald | July 10, 1962 |